United States Patent
Damhuis et al.

(10) Patent No.: US 12,246,406 B2
(45) Date of Patent: Mar. 11, 2025

(54) SPINDLE DRIVE TOOL AND METHOD OF REFILLING A LUBRICANT CARTRIDGE OF AN AUTOMATIC LUBRICATION SYSTEM USING SUCH A TOOL

(71) Applicant: AKTIEBOLAGET SKF, Gothenburg (SE)

(72) Inventors: Karen Elisa Damhuis, Losser (NL); Sebastien David, Ouderkerk aan de Amstel (NL); Paola Jimenez Moreno, Utrecht (NL); Sebastian Johannes Kass, Bad Bentheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 386 days.

(21) Appl. No.: 17/567,961

(22) Filed: Jan. 4, 2022

(65) Prior Publication Data
US 2022/0241921 A1 Aug. 4, 2022

(30) Foreign Application Priority Data
Jan. 29, 2021 (DE) .......... 102021102119.7

(51) Int. Cl.
*B23Q 11/12* (2006.01)
*B23Q 5/10* (2006.01)
*B23Q 5/20* (2006.01)

(52) U.S. Cl.
CPC .......... *B23Q 11/122* (2013.01); *B23Q 5/10* (2013.01); *B23Q 5/20* (2013.01)

(58) Field of Classification Search
CPC .................................. B23Q 11/122
See application file for complete search history.

(56) References Cited

U.S. PATENT DOCUMENTS 5,311,654 A * 5/1994 Cook ............... B23P 11/027
 279/20
6,726,223 B2 * 4/2004 Haimer ........... B23B 31/1179
 409/234

* cited by examiner

*Primary Examiner* — Vicky A Johnson
(74) *Attorney, Agent, or Firm* — J-TEK LAW PLLC; Scott T. Wakeman; Mark A. Ussai

(57) ABSTRACT

A spindle drive tool for adjusting a position of a head of a spindle relative to a piston of an electro-mechanical automatic lubrication system in which the spindle and piston are connected by complementary screw threads includes a mounting portion and a coupling portion connected to the mounting portion. The mounting portion includes a bearing surface having a spindle head inlet at a first end, a first cavity and a second cavity. The spindle head inlet opens into the first cavity, the first cavity has a cross section configured to couple with the spindle head such that the spindle head cannot rotate relative to the mounting portion while in the first cavity, and the second cavity is coaxially with the first cavity and has a larger cross section than the first cavity such that the spindle head can rotate freely in the second cavity.

12 Claims, 7 Drawing Sheets

SPINDLE DRIVE TOOL AND METHOD OF REFILLING A LUBRICANT CARTRIDGE OF AN AUTOMATIC LUBRICATION SYSTEM USING SUCH A TOOL

CROSS-REFERENCE

This application claims priority to German patent application no. 10 2021 102 119.7 filed on Jan. 29, 2021, the contents of which are fully incorporated herein by reference.

TECHNOLOGICAL FIELD

The present disclosure is directed to an apparatus for adjusting the position of a spindle head relative to a piston in a lubricant cartridge of an electro-mechanical automatic lubrication system and to a method of refilling a lubricant cartridge of an electro-mechanical automatic lubrication system using the tool.

BACKGROUND

Automatic lubrication systems are generally used to lubricate various components of a machine, such as chains, electric motors, roller and sliding bearings, shaft seals.

Typically, an electro-mechanical automatic lubrication system such as an electro-mechanical single-point automatic lubrication system may comprise a drive unit connected to an upper part of a lubricant cartridge by complementary screw threads, the lubricant cartridge including a spindle screw-attached to a piston.

The operation of such a system is based on the setting in motion by means of the drive unit of the rotatable threaded spindle in relation to a piston. Rotation of the spindle moves the piston forward within the lubricant cartridge, causing the lubricant to flow out through an outlet arranged in the lower part of the lubricant cartridge, connected to the machine point to lubricate.

The drive unit that motorizes the lubricant cartridge requires a precise position of the spindle head to ensure the coupling between the spindle head and the drive unit and, consequently, to ensure that the piston is displaced when rotating the spindle.

When a partially empty lubricant cartridge needs to be refilled, the piston will be in an unknown position. In fact, the spindle head is at an unknown height on top of the piston so that, once the cartridge has been refilled, the drive unit cannot pair properly with the spindle head when the two parts are reassembled. Therefore, the rotation of the drive unit won't be successfully granting the pushing piston movement.

Thus, the position between the spindle head and the drive unit has to be controlled in order to create enough force to push the piston and dispense the lubricant on the cartridge.

Re-positioning the spindle relative to the piston within the cartridge is done manually and it takes several minutes to position it properly. For that reason, it is usually recommended not to re-use the current cartridge but to provide a new cartridge full of lubricant.

SUMMARY

Consequently, the present disclosure is intended to overcome these disadvantages by providing means to quickly and simply ensure the right position of the spindle head on top of the piston after a lubricant refill for a proper pairing between the drive unit and the cartridge.

One aspect of the disclosure is to provide a spindle drive tool for adjusting the position of a spindle head relative to a piston of an electro-mechanical automatic lubrication system, the spindle and piston being assembled by complementary screw-threads, the spindle drive tool comprising:
  a mounting portion with one end comprising a bearing surface intended to come into contact against the piston and a spindle head inlet formed onto the bearing surface, the spindle head inlet opening into a first cavity extending axially inside the mounting portion and having a cross section configured to couple with the spindle head and opposite to the spindle head inlet, the first cavity opening into a second cavity axially on the side opposite to the spindle head inlet and extending coaxially to the first cavity and having a larger cross section than the first cavity; and
  a coupling portion connected to the mounting portion.

According to an embodiment, the second cavity may open into a third cavity axially on the side opposite to the first cavity and extending coaxially to the first cavity, the third cavity having a cross section similar to the first cavity, configured to couple with the spindle head.

As used herein, a cavity is configured to "couple" with the spindle head when the spindle head is free to move axially along the cavity but is prevented from rotating about the longitudinal axis of the spindle relative to the mounting portion. For example, if the spindle head is hexagonal, the spindle head will couple with a hexagonal cavity that is large enough to allow the spindle head to move axially along the cavity but too small to allow the spindle head to rotate in the cavity relative to the mounting portion along the axis of the spindle.

Preferably, at least one aperture extends through the thickness of the mounting portion and opens into the second cavity.

More preferably, the coupling portion extends coaxially from an end of the mounting portion opposite to said end comprising the bearing surface.

Advantageously, the mounting portion and the coupling portion may be made in one piece, notably by additive manufacturing.

The disclosure also concerns a kit for adjusting the position of a spindle head of a spindle in relation to a piston when refilling the lubricant cartridge of an electro-mechanical automatic lubrication system the spindle and piston of which being assembled by complementary screw-threads, the kit comprising:
  a first spindle drive tool as previously described, for moving the spindle head away from the piston at a first adjustment height, the length of the first cavity of the first spindle drive tool being equal to the first adjustment height; and
  a second spindle drive tool as previously described, for bringing the spindle head closer to the piston at a second adjustment height, the length of the first cavity of the second spindle drive tool being equal to the second adjustment height.

Furthermore, the invention concerns a method for refilling a lubricant cartridge of an electro-mechanical automatic lubrication system whose lubricant dispensing is based on the setting in motion of a piston by rotation of a threaded spindle screwed onto the piston, the method comprising:
  inserting the spindle head into the spindle head inlet then into the first cavity of the first spindle drive tool of a kit as previously described;
  mounting the bearing surface of the first spindle drive tool into contact against the piston;

rotating the first spindle drive tool by means of the coupling portion, until the spindle head be located in the second cavity, for bringing the spindle head away at a first adjustment height relative to the piston;

removing the first spindle drive tool from the spindle; and refilling with lubricant the empty lubricant cartridge comprising the set of the spindle and the piston having the spindle head at the first adjustment height relative to the piston.

Preferably, the method for refilling the lubricant cartridge may also comprise the following steps:

inserting the spindle head into the spindle head inlet then into the first cavity up to the third cavity of the second spindle drive tool of the kit as previously described;

mounting the bearing surface of the second spindle drive tool into contact against the piston;

rotating the second spindle drive tool by means of the coupling portion until the spindle head is located in the second cavity, for bringing the spindle head closer to the piston, from the first adjustment height to a second adjustment height;

removing the second spindle drive tool from the spindle.

Other advantages and features of the invention will appear from the detailed description of embodiments of the invention, which are non-limiting examples, illustrated on the appended drawings of which:

DETAILED DESCRIPTION

Figure 1:
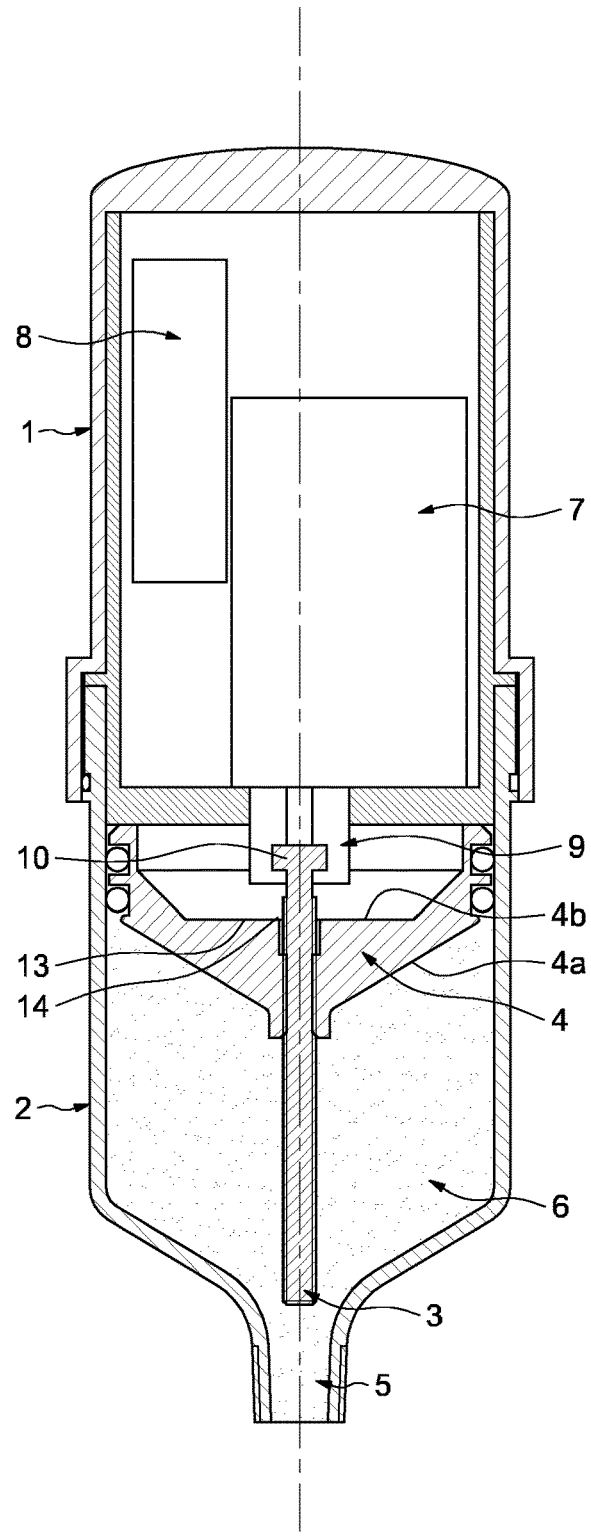
FIG. 1 is a sectional view of an electro-mechanical single-point automatic lubrication system.

As shown in FIG. 1, an electro-mechanical single-point automatic lubrication system generally comprises a drive unit 1 connected by screwing to the upper part of a lubricant cartridge 2.

Lubricant dispensing is based on the setting in motion by means of the drive unit 1 of a rotatable threaded spindle 3 in relation to a piston 4. The piston 4 and the spindle 3 are connected by complementary screw-threads.

Rotation of the spindle 3 moves the piston 4 forward inside the lubricant cartridge 2 which causes the lubricant 6 to flow out through an outlet 5 arranged in the lower part of the lubricant cartridge 2.

As shown in FIG. 1, the piston 4 comprises a pushing surface 4a facing the outlet 5 of the lubricant cartridge 2, and an opposite surface 4b facing the spindle head 10.

The drive unit 1 includes an electric motor 7, a battery 8 and a coupling element 9 connecting the spindle head 10 to the drive unit 1.

When the drive unit 1 is powered on, the electro-mechanical single-point automatic lubrication system delivers lubricant 6 at a lubrication point of a machine to which it is attached. The drive unit 1 can be programmed to control the lubricant dispensing speed and time in order to dispense an appropriate amount of lubricant 6 depending on the application.

When the lubricant cartridge 2 is empty or partially empty, the drive unit 1 and the lubricant cartridge 2 are disassembled for lubricant refilling.

FIGS. 2A, 2B, 2C, 3A and 3B illustrate two spindle drive tools for adjusting the spindle head position relative to the piston to facilitate refilling the lubricant cartridge 2 and re-assembling the drive unit 1 and the lubricant cartridge 2.

Figure 2A:
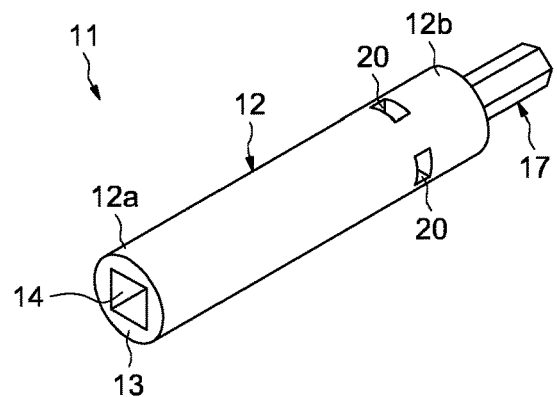
FIG. 2A is a perspective view of a first embodiment of a tool according to an embodiment of the present disclosure.
Figure 2B:
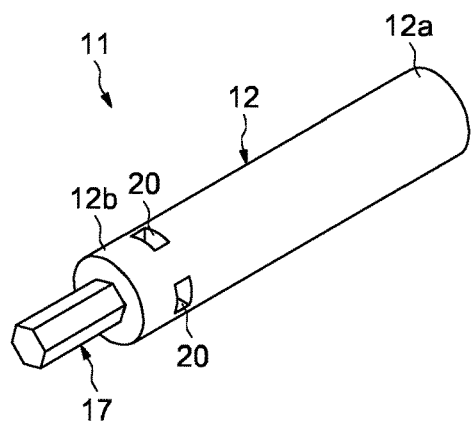
FIG. 2B is a perspective view of the tool of FIG. 2A.
Figure 2C:
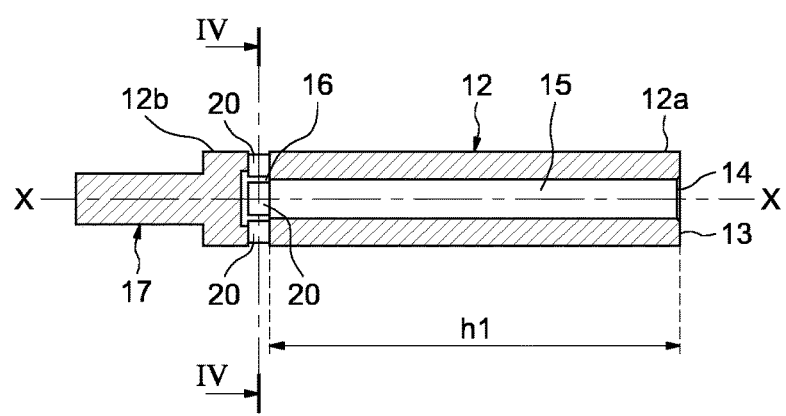
FIG. 2C is a sectional view through the longitudinal axis of the tool in FIGS. 2A and 2B.

FIGS. 2A, 2B and 2C represents a first embodiment of a spindle drive tool for moving the spindle head 10 away from the piston, at a first adjustment height $h_1$.

The spindle drive tool 11 according to the first illustrated embodiment comprises a mounting portion 12 with one end 12a including a bearing surface 13 intended to come into contact against the piston 4 while adjusting the spindle head 10 position, and a spindle head inlet 14 formed on the bearing surface 13.

The spindle head inlet 14 has a cross section configured to couple with the spindle head 10.

In the illustrated example, the mounting portion 12 is cylindrical and has a circular cross section. According to another embodiment, the mounting portion 12 may have a different shape; for example, a hexagon, a square, etc.

Furthermore, the mounting portion 12 is hollow so that the spindle head inlet 14 opens into a first cavity 15 that extends axially inside the cylindrical portion 12. The first cavity 15 has a cross section configured to couple with the spindle head 10 and a length adapted to a coaxial spindle head movement along the longitudinal axis X of the cylindrical portion 12.

In the illustrated example, the cross section of the spindle head 10 is square. In order to couple with the spindle head 10, cross sections of the spindle head inlet 14 and the first cavity 15 are also square. The spindle drive tool 11 can be designed to suit to all spindle head 10 different profiles, such as hexagonal, square, etc.

Advantageously, the length of the first cavity 15 is equal to a first adjustment height $h_1$ at which it is desired to bring the spindle head 10 in relation to the piston 4, in particular on top of the piston 4.

Opposite to the spindle head inlet 14, the first cavity 15 opens into a second cavity 16 near the axially opposite end of the cylindrical portion 12 from the spindle head inlet 14. The second cavity 16 extends coaxially to the first cavity 15 The second cavity 16 extends axially inside the cylindrical portion 12. The cross section of the second cavity 16 is larger than the cross section of the first cavity so that the spindle head 10 cannot couple with the second cavity 16. The larger cross section of the second cavity 16 allows to stop the spindle head 10 movement within the cylindrical portion 12 at the first adjustment height $h_1$ in relation to the piston 4, while rotating the spindle drive tool 11.

The length of the first cavity 15 means the length between the spindle head inlet 14 and the second cavity 16.

Moreover, the spindle drive tool 11 comprises a coupling portion 17 connected to the cylindrical portion 12. Preferably, the coupling portion 17 extends coaxially from the end 12b of the cylindrical portion opposite to the end 12a provided with the spindle head inlet 14.

To speed up the adjusting spindle head position in relation to the piston 4, the coupling portion 17 of the illustrated embodiment is configured to couple with an automatic rotating drive unit (not shown in the Figures), of the cylindrical portion 12. As shown, the coupling portion 17 can include a battery-operated drill holder.

The coupling portion 17 thus allows the spindle drive tool 11 to be driven in rotation for transmitting the rotational movement to the spindle 3 when the spindle head 10 and the cylindrical portion 12 are coupled.

Alternatively, the coupling portion 17 may be configured to couple with a manual rotating device, for example a screwdriver or a wrench.

The configuration of the spindle drive tool 11 according to the first embodiment allows the spindle head 10 to be moved away from the piston 4, by a distance equal to the first adjustment height $h_1$ on top of the piston 4 which is equal to the length of the first cavity 15.

Figure 3A:
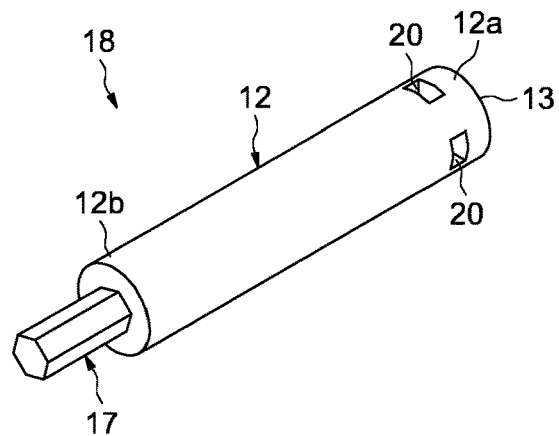
FIG. 3A is a perspective view of a second embodiment of a tool according to the present disclosure.
Figure 3B:
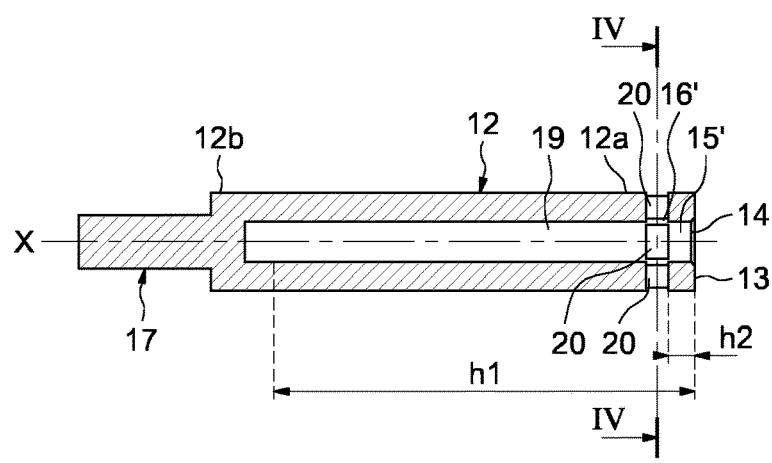
FIG. 3B is a sectional view through the longitudinal axis of the tool of FIG. 3A.

FIGS. 3A and 3B represents a second embodiment of a spindle drive tool 18 for bringing the spindle head 10 closer to the piston 4, at a second adjustment height $h_2$.

The first and second adjustment heights $h_1$ and $h_2$ are predefined heights to which it is desired to adjust the spindle head 10 in relation to the piston 4. In the illustrated examples, the first adjustment height $h_1$ is greater than the second adjustment height $h_2$.

Similar items with the first embodiment of the spindle drive tool 11 have the same reference numerals.

In a manner similar to the first embodiment, the spindle drive tool 18 comprises a first cavity 15' opening into a second cavity 16'. Nevertheless, the length of the first cavity 15' of the second embodiment of the spindle drive tool 18 differs from the length of the first cavity 15 of the first embodiment of the spindle drive tool 11. Indeed, the length of the first cavity 15' of the second embodiment of the spindle drive tool 18 is equal to the second adjustment height $h_2$ at which it is desired to bring the spindle head 10 in relation to the piston 4.

Besides, in a manner similar to the first embodiment, the cross section of the second cavity 16' is larger than the first cavity 15' in order not to couple with the spindle head 10. It thus allows to stop the spindle head 10 movement within the cylindrical portion 12 at the second adjustment height $h_2$ in relation to the piston 4, while rotating the spindle drive tool 11.

In addition, the second cavity 16' opens into a third cavity 19 axially on the side opposite to the first cavity 15'. The third cavity 19 extends coaxially to the first cavity 16' and has a cross section similar to the first cavity 15'. The cross section of the third cavity 15' which is equal to the cross section of the first cavity is configured to couple with the spindle head 10. The third cavity 19 extends axially inside the cylindrical portion 12.

Preferably, the length of the third cavity 19 is such that the sum of the lengths of the first cavity 15', the second cavity 16' and the third cavity 19 allows the spindle 3 to extend inside the cylindrical portion 12 when the bearing surface 13 of the second spindle drive tool 18 comes into contact against the piston 4. Consequently, the spindle drive tool 18 of the second embodiment is able to couple with the spindle head 10 when the spindle head 10 is at the first adjustment height $h_1$ in relation to the piston 4, with the bearing surface 13 being into contact against the piston 4.

In another embodiment, the third cavity 19 may have a length greater than the sum of the first adjustment $h_1$ and the height of the spindle head 10.

The set of the first, second and third cavities 15', 16', 19 forms a blind slot for receiving the spindle head 10, with three sections of various cross section.

Preferably, the third cavity 19 forms, advantageously, an abutment to the spindle head 10 when the spindle head 10 fully extends within the first cavity 15', the second cavity 16' and the third cavity 19.

Preferably, the cross section of the second cavity 16' is circular whose diameter allows the second cavity 16' not to couple with the spindle head 10.

The configuration of the spindle drive tool 18 according to the second embodiment allows the spindle head 10 to be brought closer to the piston 4, at the second adjustment height $h_2$ in relation to the piston 4 which is equal to the length of the first cavity 15'.

Figure 4:
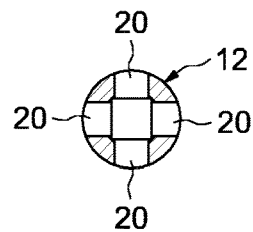
FIG. 4 is a sectional view through the transverse axis IV-IV in FIGS. 2C and 3B.

FIG. 4 is a sectional view through the transverse axis IV-IV, representing the circular cross section of the second cavity 16 of the first embodiment 11.

At least one aperture 20 may extend through the thickness of the cylindrical portion 12, opening into the second cavity 16, 16'. As shown, in the first and second embodiments of the spindle drive tool 11 and 18, the second cavity 16, 16' comprises here four apertures 20, arranged at 90° to each other. The apertures 20 make it possible to visually check that the spindle head 10 is located in the second cavity 16, 16', adjusted to the right and desired position.

Furthermore, the cylindrical portion 12 and the coupling portion 17 are preferably made in one piece, notably by additive manufacturing which simplifies the manufacture of the complex shape of the spindle drive tools 11, 18.

In the context of this disclosure, the phrase "made in one piece" mean that the cylindrical portion 12 and the coupling portion 17 form a monobloc unit.

Alternatively, the cylindrical portion 12 and the coupling portion 17 may be two different pieces attached one another.

Another aspect of the disclosure is a method for refilling the lubricant cartridge 2 of an electro-mechanical automatic lubrication system such as, for example, the electro-mechanical automatic lubrication system shown in FIG. 1, whose lubricant dispensing is based on causing movement of the piston 4 by rotating the threaded spindle 3 that is screwed onto the piston 4.

Figure 5:
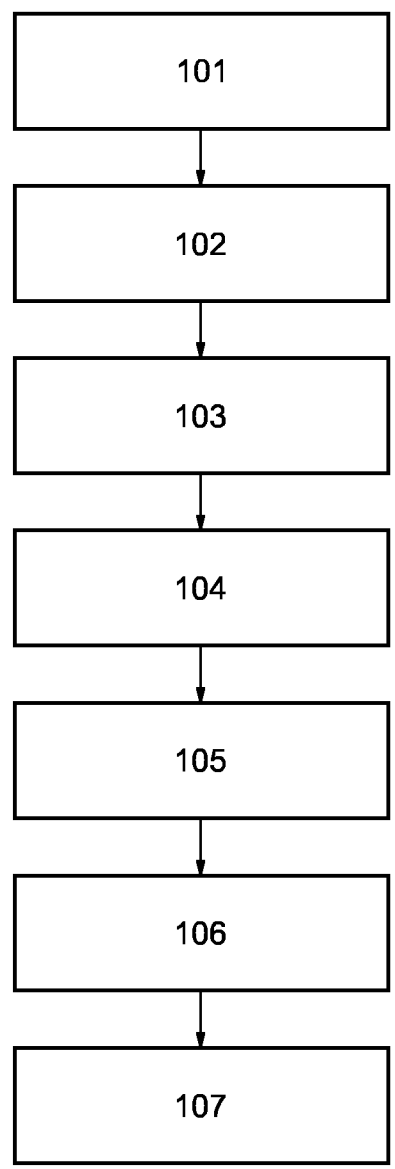
FIG. 5 is a flow chart illustrating a method for refilling an electro-mechanical automatic lubrication system according to an embodiment of the invention.
Figure 6:
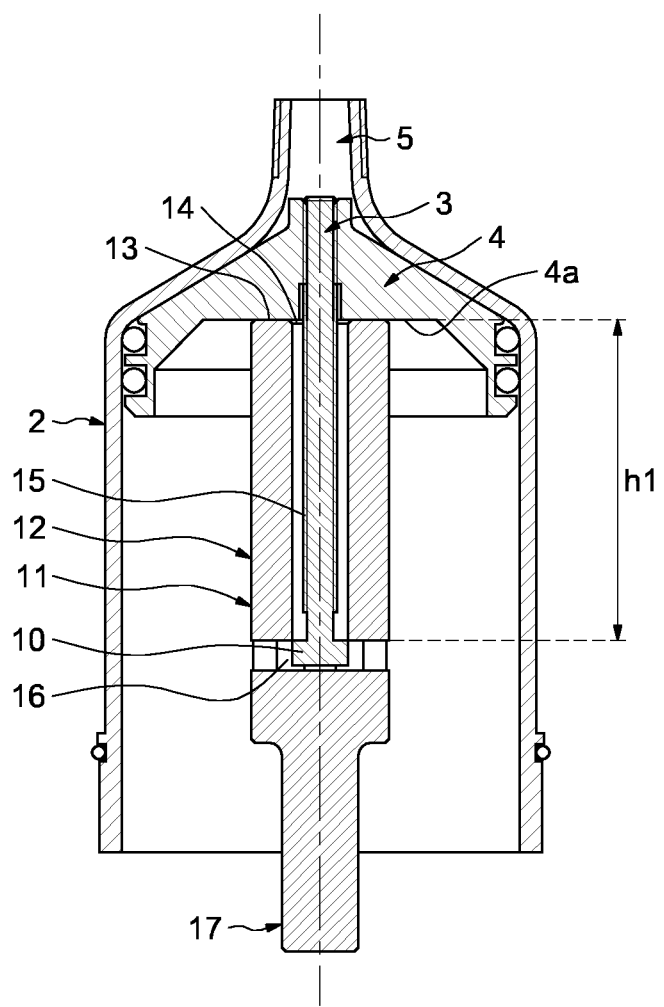
FIG. 6 is a sectional view of the first embodiment of the tool coupled with the spindle head of an empty cartridge in a correct position for lubricant refilling.
Figure 7:
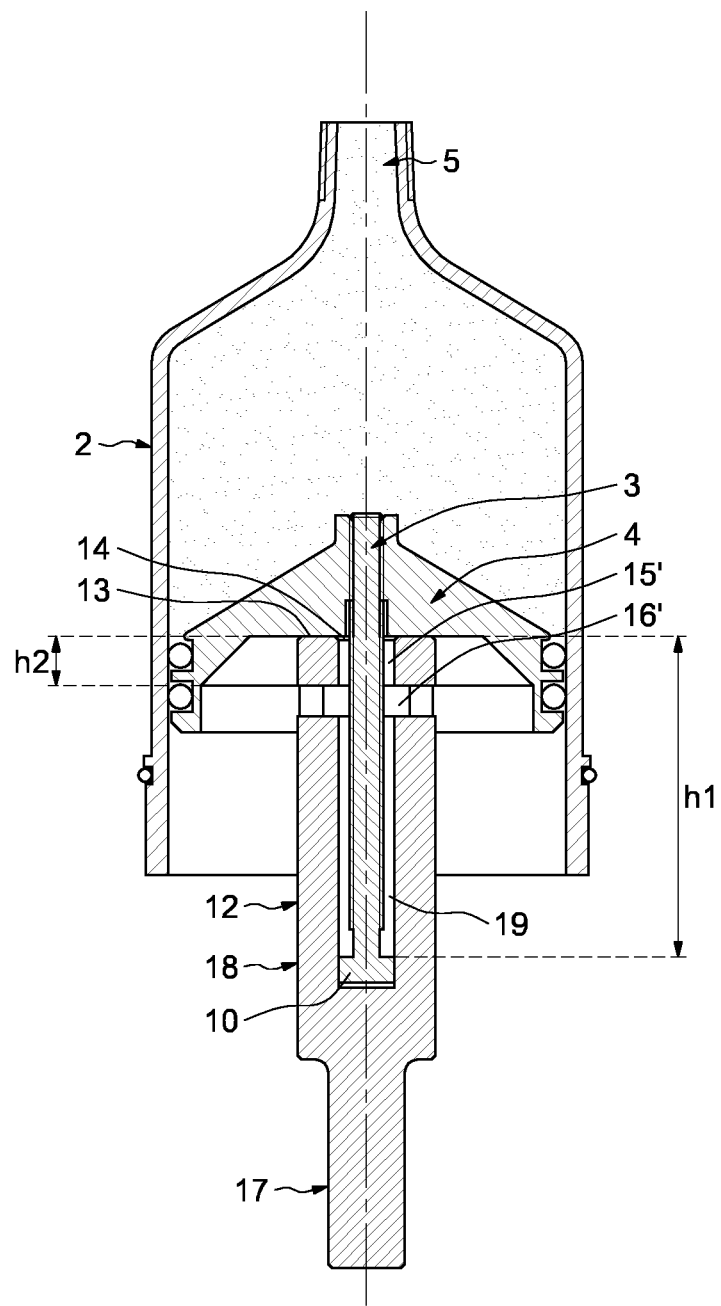
FIG. 7 is a sectional view of the cartridge of FIG. 6 after the refill has been completed coupled with the second embodiment of the tool ready for adjusting the position of the spindle head.
Figure 8:
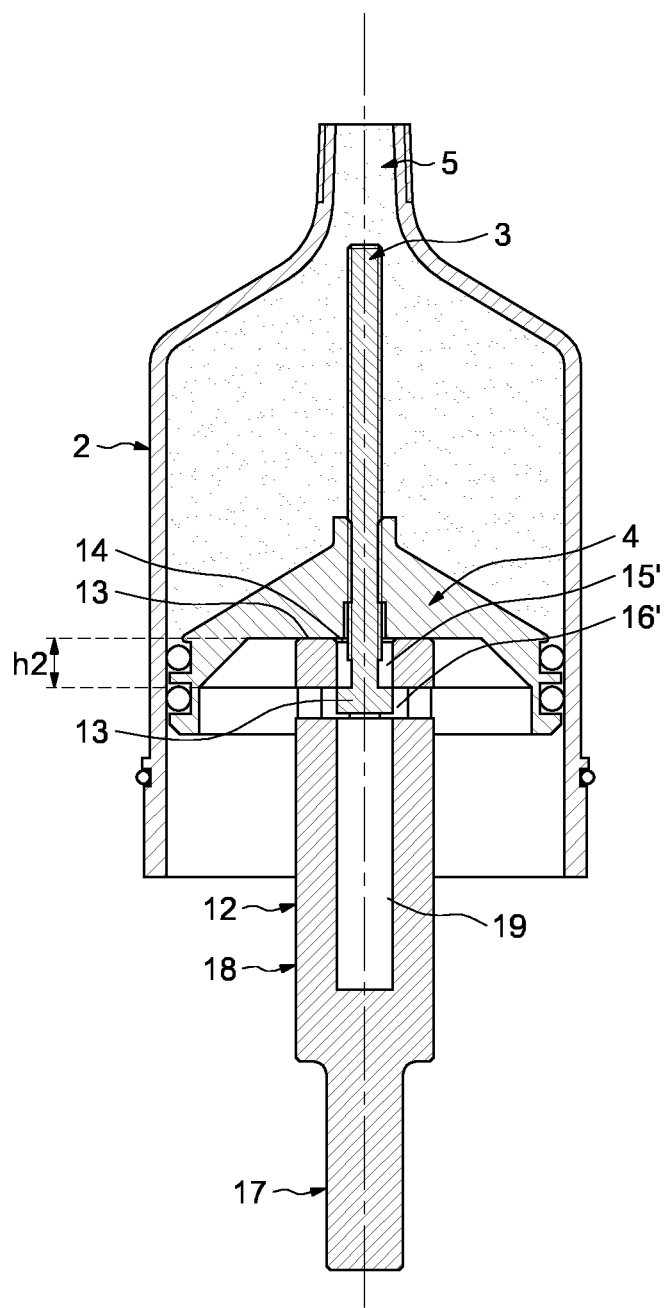
FIG. 8 is a sectional view of the second embodiment of the tool coupled with the spindle head of the full cartridge of FIG. 7.

An embodiment of a method for refilling the lubricant cartridge is illustrated in FIG. 5, whose several steps are structurally illustrated in FIGS. 6, 7 and 8.

In a first step 101, when the lubricant cartridge 2 is empty, or partially empty, the drive unit 1 and the lubricant cartridge 2 are disassembled for refilling.

If the lubricant cartridge 2 is only partially empty, the piston 4 is preferably brought to the bottom of the lubricant cartridge 2 in order to expel all remaining lubricant through the outlet 5, in an additional step 102. Pushing the piston 4 may be carried out by means of a dedicated preparation tool.

After removing the piston 4 and the spindle 3 out of the lubricant cartridge 2, the method of refilling can include cleaning the external lubricant cartridge walls with cloth, removing contamination in the outlet 5, and lubricating the piston seals and the walls of the lubricant cartridge. Optical inspection can also be carried out for checking cartridge quality.

If the spindle 3 and the piston 4 have been disassembled, they are re-assembled, and in a next step 103, the spindle 3 and piston 4 assembly is inserted at the bottom of the pre-emptied lubricant cartridge 2.

The illustrated method of refilling comprises adjusting the position of the spindle head 10 in relation to the piston 4 by means of a kit comprising a spindle drive tool 11 according to the first embodiment and a spindle drive tool 18 according to the second embodiment.

The spindle head 10 is brought in a next step 104 to the first adjustment height $h_1$ relative to the piston 4 named below as "empty position" and visible in FIG. 6. In the "empty position", the spindle 3 rod forms a sealing barrier preventing the lubricant 6 from passing to the other side of the piston 4 which is required during the following step 105 of re-introducing lubricant into the lubricant cartridge 2. The spindle 3 rod is positioned so that it does not extend in the lubricant cartridge 2 portion filled with lubricant 6, located between the piston 4 and the outlet 5. The spindle 3 is located into the piston 4 so that the free end of the spindle rod closes the opened end of the piston 4 facing the outlet 5. Such a position also prevents the free end of the spindle rod from hindering the lubricant 6 entry through the outlet 5 while refilling.

The spindle head 10 is arranged in the "empty position" in relation to the piston 4 by means of a spindle drive tool 11 according to the first embodiment. The spindle drive tool 11 according to the first embodiment is named below as "first spindle drive tool" 11.

The spindle head 10 is inserted into the spindle head inlet 14 then into the first cavity 15 of the first spindle drive tool 11 in order to couple the first spindle drive tool 11 with the spindle head 10. Then, the bearing surface 13 of the first spindle drive tool 11 is arranged into contact against the bearing surface 4b of the piston 4.

Thus, the first spindle drive tool 11 is rotated by connecting the coupling portion 17 to, in the illustrated example, a battery-operated drill. Unscrewing is conducted until the spindle head 10 is located in the second cavity 16, for bringing the spindle head 10 away at the first adjustment height $h_1$ relative to the piston 4.

When the spindle head 10 reaches the second cavity 1, the spindle 3 can no longer rotates and the first adjustment height $h_1$, i.e. the empty position, visible in FIG. 6, is reached by the spindle head 10. The apertures 20 allows checking that the spindle head 10 is actually inside the second cavity 16. The first spindle drive tool 11 is then removed from the spindle 3.

Alternatively, the position adjustment of the spindle head 10 relative to the piston 4 in step 104 may be carried out before inserting the spindle 3 and piston 4 assembly inside the lubricant cartridge 2.

Re-introducing lubricant into the lubricant cartridge 2 via the outlet 5 can thus be conducted in a following step 105. While refilling, lubricant pushes the piston 4 and spindle 3 assembly in a final position inside the lubricant cartridge 2 visible in FIG. 7.

After a complete refill of the lubricant cartridge 2, the spindle head 10 is not in a correct position in relation to the lubricant cartridge 2 to pair with the drive unit 1. The spindle head 10 needs to be brought closer to the piston 4, in an additional step 106, in a position named below as "full position", illustrated in FIG. 8, where the spindle head 10 is at the second adjustment height $h_2$ in relation to the piston 4.

The spindle head 10 is arranged in the "full position" by means of the spindle drive tool 18 according to the second embodiment. The spindle drive tool 18 according to the second embodiment is named below as "second spindle drive tool" 18.

In the second spindle drive tool 18, the sum of the lengths of the first cavity 15', the second cavity 16' and the third cavity 19 is equal to the first adjustment height $h_1$ associated with the "empty position" of the spindle 3. Moreover, the length of the second cavity 16' is equal to the second adjustment height $h_2$ associated with the "full position" of the spindle 3. Such a configuration allows the second embodiment of the spindle drive tool 18 to move the spindle 3 from the "empty position" to the "full position".

As shown in FIG. 7, the spindle head 10 has been inserted into the spindle head inlet 14 of the second spindle drive tool 18. The spindle head 10 is then inserted into the first cavity 15' up to the third cavity 19 by rectilinear translation.

In the illustrated example, the spindle head 10 is inserted up to the third cavity 19 until the bearing surface 13 of the second spindle drive tool 18 is arranged into contact against the piston 4.

Thus, the second spindle drive tool 18 is rotated by connecting the coupling portion 17 to, in the illustrated example, the battery-operated drill. Screwing is conducted until the spindle head 10 is brought from the first adjustment height $h_1$ to the second adjustment height $h_2$.

When the spindle head 10 reaches the second cavity 16', the spindle head 10 can no longer rotate. The spindle head 10 is thus located at the second adjustment height $h_2$ in relation to the piston 4 and "full position" visible in FIG. 8 is thus reached by the spindle 3.

The adjustment to the "full position" of the spindle head 10 can be checked through the apertures 20 by the presence of the spindle head 10 in the second cavity 16'.

The second drive tool 18 is then removed from the spindle 3 and, in a final step 107, the drive unit 1 can be paired with the refilled lubricant cartridge 2, to obtain an electro-mechanical single-point automatic system ready to use, as illustrated in FIG. 1.

The first and second spindle drive tools 11, 18 allow adjusting the position of the spindle head 10 in relation to the piston 4, by moving the spindle head 10 toward or away from the piston 4. The dimensions of the cylindrical portion 12 of the spindle drive tools 11, 18 and, in particular the dimensions of the first, cavity 15, 15' can be adjusted in function to the desired height of the spindle head 10 in relation to the piston 4.

Using a tool 11, 18 according to the disclosure prevents the drive unit 1 to have lose end and ensures that the lubricant cartridge 2 is filled properly to guarantee coupling of the drive unit 1 on the lubricant cartridge 2. It also makes it possible to speed up the spindle head 10 positioning process.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods and devices for positioning a spindle relative to a piston in a lubricant cartridge.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A spindle drive tool for adjusting a position of a spindle head of a spindle relative to a piston of an electro-mechanical automatic lubrication system, the spindle and piston being connected by complementary screw threads, the spindle drive tool comprising:
    a mounting portion having a bearing surface at a first end, the bearing surface being configured to contact the piston and having a spindle head inlet, the spindle head inlet opening into a first cavity extending axially inside the mounting portion, the first cavity having a first end at the spindle head inlet and a second end axially spaced from the first end and a cross section configured to couple with the spindle head, the second end of the first cavity opening into a second cavity, the second cavity being coaxially to the first cavity and having a larger cross section than the first cavity; and
    a coupling portion for coupling the mounting portion to a rotatable drive,
    wherein the spindle has an axis of rotation,
    wherein the mounting portion comprises an axial centerline and a second end axially spaced from the first end,
    wherein the first cavity is configured to permit axial movement of the spindle head in the first cavity relative to the mounting portion and to substantially prevent rotation of the spindle head in the first cavity relative to the mounting portion about the axis of rotation of the spindle head,
    wherein the second cavity is configured to permit rotation of the spindle head in the second cavity relative to the mounting portion, and
    wherein the coupling portion is located at the second end of the mounting portion.

2. The spindle drive tool according to claim 1, wherein the mounting portion includes at least one aperture extending through a side wall of the mounting portion and into the second cavity.

3. The spindle drive tool according to claim 1, wherein the coupling portion extends coaxially from the second end of the mounting portion.

4. The spindle drive tool according to claim 1, wherein the mounting portion and the coupling portion are made in one piece.

5. The spindle drive tool according to claim 1, wherein the mounting portion includes a third cavity on a side of the second cavity opposite the first cavity, the third cavity being coaxial with the first cavity and having a cross section configured to couple with the spindle head.

6. The spindle drive tool according to claim 1, wherein the coupling portion comprises a rod extending from the second end.

7. The spindle drive tool according to claim 5, wherein the third cavity is configured to permit axial movement of the spindle head in the third cavity relative to the mounting portion and to substantially prevent rotation of the spindle head in the third cavity relative to the mounting portion about the axis of rotation of the spindle head.

8. A kit for adjusting a position of a spindle head of a spindle relative to a piston of a lubricant cartridge of an electro-mechanical automatic lubrication system in which the spindle and the piston are connected by screw-threads, the kit comprising:
    first and second spindle drive tools according to claim 1,
    wherein the first spindle drive tool is configured to move the spindle head away from the piston to a first location a first distance from the piston, a length of the first cavity of the first spindle drive tool being equal to the first distance,
    wherein the second spindle drive tool is configured to move the spindle head toward the piston to a second location a second distance from the piston, a length of the first cavity of the second spindle drive tool being equal to the second distance, and
    wherein the second spindle drive tool includes a third cavity on a side of the second cavity of the second spindle drive tool opposite the first cavity of the second spindle drive tool, the third cavity being coaxial with the first cavity of the second spindle drive tool and having a cross section configured to couple with the spindle head.

9. A method for refilling a lubricant cartridge of an electro-mechanical automatic lubrication system, the lubricant cartridge including a piston mounted on a threaded spindle and a lubricant outlet, the method comprising:
    providing a kit according to claim 8,
    inserting the spindle head into the first cavity of the first spindle drive tool via the spindle head inlet of the first spindle drive tool until the bearing surface of the first spindle drive tool contacts the piston;
    rotating the first spindle drive tool via the coupling portion of the first spindle drive tool in a first direction until the spindle head enters the second cavity of the first spindle drive tool to bring the spindle head to the first location;
    removing the first spindle drive tool from the spindle; and
    pumping lubricant into the lubricant cartridge via the lubricant outlet.

10. The method for refilling according to claim 9, further comprising:
    inserting the spindle head into the third cavity of the second spindle drive tool via the first and second cavities of the second spindle drive tool until the bearing surface of the second spindle drive tool contacts the piston;
    rotating the second spindle drive tool via the coupling portion of the second spindle drive tool in a second direction opposite the first direction until the spindle head is located in the second cavity to bring the spindle head to the second location; and removing the second spindle drive tool from the spindle.

11. A method for refilling a lubricant cartridge of an electro-mechanical automatic lubrication system, the lubricant cartridge including a piston mounted on a threaded spindle and a lubricant outlet, the method comprising:

providing a spindle drive tool according to claim 1;

inserting the spindle head into the first cavity of the spindle drive tool via the spindle head inlet until the bearing surface of the spindle drive tool contacts the piston;

rotating the spindle drive tool via the coupling portion in a first direction until the spindle head enters the second cavity of the first spindle drive tool to bring the spindle head to the first location;

removing the first spindle drive tool from the spindle; and pumping lubricant into the lubricant cartridge via the lubricant outlet.

12. A spindle drive tool for adjusting a position of a spindle head of a spindle relative to a piston of an electro-mechanical automatic lubrication system, the spindle and piston being connected by complementary screw threads, the spindle drive tool comprising:

a mounting portion having a bearing surface at a first end, the bearing surface being configured to contact the piston and having a spindle head inlet, the spindle head inlet opening into a first cavity extending axially inside the mounting portion, the first cavity having a first end at the spindle head inlet and a second end axially spaced from the first end and a cross section configured to couple with the spindle head, the second end of the first cavity opening into a second cavity, the second cavity being coaxially to the first cavity and having a larger cross section than the first cavity; and a coupling portion connected to the mounting portion, wherein the mounting portion includes at least one aperture extending through a side wall of the mounting portion and into the second cavity.

* * * * *